April 24, 1934.  F. R. KEMMER  1,955,964
METHOD OF DISTILLATION AND CONDENSATION
Filed July 11, 1933
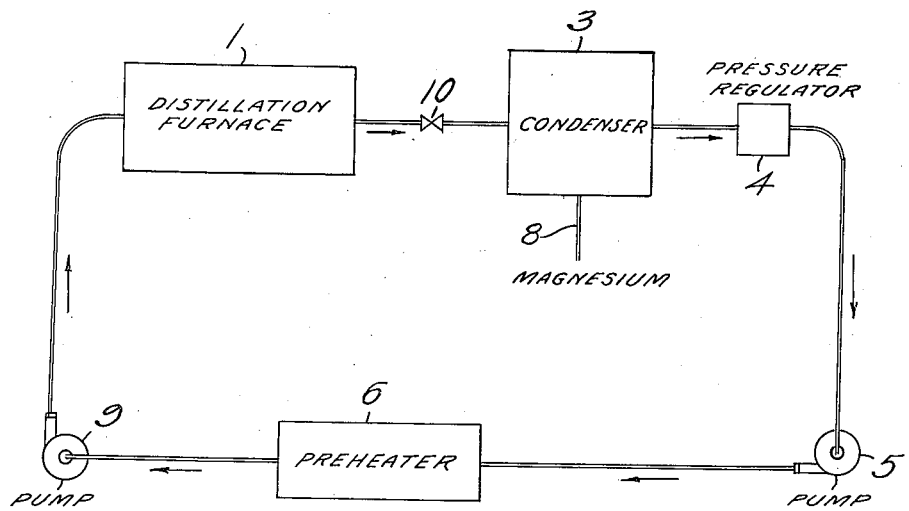
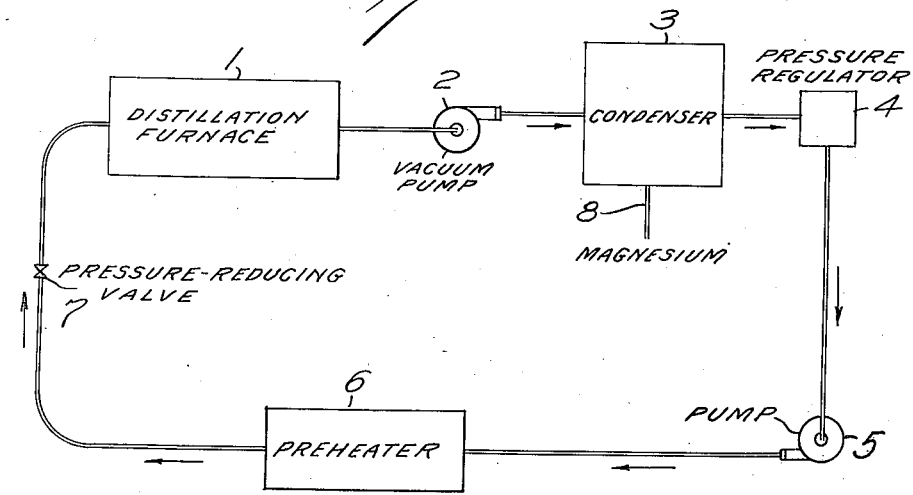
INVENTOR
FRANK R. KEMMER,
BY
ATTORNEY Patented Apr. 24, 1934

1,955,964

UNITED STATES PATENT OFFICE 1,955,964

METHOD OF DISTILLATION AND CONDENSATION

Frank R. Kemmer, Larchmont, N. Y., assignor to Magnesium Products, Inc., Wilmington, Del., a corporation of Delaware Application July 11, 1933, Serial No. 679,836

22 Claims. (Cl. 75—17)

This invention relates to the treatment of impure magnesium for the refining thereof. More particularly, it relates to the distillation of the impure magnesium under special conditions so as to provide a metal having a high degree of purity.

Magnesium metal as ordinarily produced is relatively impure and contains therein various substances which have an appreciable vapor pressure at the ordinary boiling point of magnesium and therefore they distill over with the magnesium and give an impure condensate. Therefore, distillation and condensation of magnesium by methods ordinarily used in the distillation of other substances does not give the desired result.

Various methods have been suggested for the treatment of impure magnesium in order to refine the same by distillation. In my co-pending application Serial #542,104, filed June 4, 1931 entitled "Method of producing magnesium" I have described a system for the distillation and condensation of magnesium in which substantially the entire distilling and condensing system was under reduced pressure. The distillation took place at a temperature below the ordinary atmospheric boiling point and condensation as well as distillation was under reduced pressure. A high degree of vacuum may be used and in such case, although the operation was perfectly feasible and produced metal of high purity with good efficiency there was a disadvantage in that the entire system was under the vacuum. By reason of this the operation was necessarily a batch operation and great care was necessary to make air tight connections which was rather difficult and such connections had to be replaced or repaired from time to time.

The present invention is intended to derive all of the benefits of a vacuum system of distillation and condensation without the disadvantages thereof. My new invention contemplates minimizing the equipment which is held under a vacuum and it also contemplates in some cases the elimination of a vacuum entirely from the system.

In practicing my invention I may provide a system in which the distilling vessel or furnace is subjected to a high degree of vacuum by means of a vacuum pump located immediately adjacent to the distilling furnace. I provide means whereby only the distilling furnace is under the vacuum and the condenser and other parts of the apparatus are at approximately normal pressures. By reason of this I may reduce the temperature of distillation to such a low degree that substantially no impurities are volatilized with the magnesium and I conduct the remainder of the operation at normal pressures. This minimizes the danger and chances of leaks into the condensing system of air from the outside.

In another embodiment of my invention I eliminate the vacuum entirely even from the distilling vessel or furnace, by introducing into the system an inert or reducing gas and maintaining a sufficient pressure in the system to prevent danger of leakage of air into the same. While with this arrangement I may have a pressure below atmospheric I prefer that the pressure throughout the system be near, at or above atmospheric. By controlling the temperature of the distillation furnace to the desired point and by properly proportioning the partial pressures of the magnesium vapors and of the inert or reducing gas, I may regulate the character of the vapors so as to prevent any substantial vaporization of the undesirable impurities in the metal. By this means I obtain the same result as by even a very high vacuum with all of the advantages of obtaining a pure metal economically, but none of the disadvantages inherent in vacuum apparatus. This allows the use of equipment at a moderate cost, decreases the amount of supervision and repairs and gives a perfectly satisfactory product.

Of great importance in this embodiment is the fact that under these conditions it is possible to use distillation equipment allowing of continuous movement of the material and it results in the economic advantages inherent in continuous distillation and condensation.

In the accompanying drawing constituting a part hereof and in which like reference characters indicate like parts, Figure 1 is a diagrammatic view showing a flow-sheet of one embodiment of my invention, and Figure 2 is a similar flow sheet illustrating another embodiment of the invention.

With reference to Figure 1 there is provided a distillation vessel or furnace 1, having immediately adjacent thereto and as close as practical, a vacuum pump 2 which removes vapors generated in the vessel and forces the same into condenser 3. The pressure in the condenser is greater than the pressure in the distilling furnace and therefore the temperature of the condenser may be relatively high, in fact, it may even be held at approximately the same temperature as or at a higher temperature than the distilling furnace by added heat. This is of advantage in that no special means are required for cooling the condenser. Also by means of pressure regulator 4 attached to the condenser, any desired pressure may be held in condenser 3 and the character of the metal condensed therein may thereby be controlled. Ordinarily liquid magnesium is produced in the condenser but the pressure and temperature may be so regulated as to cause the magnesium to condense to the solid state.

While the system may be operated without the introduction of an inert or reducing gas, I prefer to conduct the entire operation with such a gas and therefore my system includes a pump 5 attached to the outlet of the pressure regulator to force the gases through a preheater 6, through the pressure reducing valve 7 and into the distillation furnace. In some cases it may be desirable to remove excess gas from the system, which may be done in any desired manner. The product is removed from the condenser as shown at 8. In case the condenser 3 is operated at approximately the same temperature as the furnace 1 very little, if any, preheat will be necessary in the preheater 6.

In the form shown in Figure 2 the distillation vessel 1 is connected to condenser 3 having in communication therewith pressure regulator 4. A pump 5 causes a circulation of gases from condenser 3 through preheater 6 and another pump 9 circulates said gases through the distillation furnace. An inert or reducing gas in substantial amount is introduced into the system and is circulated as shown. Distillation vessel 1 is maintained at a relatively low temperature, below the normal boiling point of magnesium. The exact temperature maintained is dependent upon the vapor pressures and the character of the impurities contained in the metal and in some cases an extremely low temperature is necessary, although for normal purposes a temperature of about 550° to 650° C. is suitable. This gives a substantial partial pressure of magnesium vapors with a minimum of partial pressures of vapors of undesirable impurities. The remainder of the pressure is made up by the inert or reducing gas. The amount thereof may be such that the furnace 1 is maintained at a pressure below, at, or above atmospheric. The current of gas sweeps out the magnesium vapors and brings them to condenser 3 where the magnesium is condensed and may be removed as shown at 8 in liquid or solid form.

I may provide a valve 10 or other suitable means between the distilling vessels and the condenser and restrict to a greater or less extent the flow of gases, thereby providing a higher pressure in the distilling vessel and a lower pressure thruout the rest of the system. This is advantageous in that with a higher pressure of distillation a higher pressure of magnesium vapor may be obtained, the differential in pressure between the distillation vessel and condenser causes a positive flow and increased speed of distillation and the relatively low pressure in the remainder of the system minimizes the difficulties inherent in operating at higher pressures.

By reason of the circulation of gas in the system and the low temperature of distillation, the present process becomes very economical in that the amount of energy necessary for distilling is very low. Close and effective control of the operation is obtained by reason of the closed system and the regulation of the pressure. The maintenance and repair of the system is small due to the fact that no high vacuum is used at any point and a product of high purity is obtained because of the ability to accurately control the partial pressure of the magnesium vapors.

Although I have described my invention setting forth several embodiments thereof, it is to be understood that my invention does not reside merely in the details of operation or of apparatus disclosed above. Various changes in both operation and construction may be made within the scope of my invention. For instance, the preheater 6 may be entirely dispensed with and the preheating of the gas may be accomplished in the distillation furnace 1. Proper regulation is obtainable without the use of special regulators such as valves 4 and 7, and pump 5 or pump 9 may be eliminated from the systems with good results. Other apparatus, as is well-known in the distillation art, may be inserted into the system. These and other changes may be made in my invention without departing from the principles herein set forth and the invention is not to be limited except as set forth in the claims appended hereto.

By the term "distillation" as used herein, I mean the process of converting solid or liquid materials into the vaporous or gaseous condition by the application of heat; in other words, I mean vaporization in its broadest aspects, including evaporation and sublimation. By the term "condensation" as used herein, I mean the process of converting materials from the vaporous or gaseous condition into the compact solid or liquid phase.

What I claim is:

1. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser.

2. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser, and circulating residual gas cyclically thru the system.

3. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser, circulating residual gas cyclically thru the system and preheating said gas prior to introducing the same into the vaporizing step.

4. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser, introducing an indifferent gas into the system and circulating the same cyclically therein.

5. A method of refining magnesium which comprises vaporizing impure magnesium metal at a temperature below the normal boiling point at atmospheric pressure in the presence of an indifferent gas, conducting the vapors thus produced into a condenser and maintaining a pressure in said system at or near atmospheric.

6. A method of refining magnesium which comprises vaporizing impure magnesum metal at a temperature below the normal boiling point at atmospheric pressure in the presence of an indifferent gas, conducting the vapors thus produced into a condenser and maintaining a pressure in said system at or near atmospheric and circulating said gas cyclically thru the system.

7. A method of refining magnesium which comprises vaporizing impure magnesium metal at a temperature below the normal boiling point at atmospheric pressure in the presence of an indifferent gas, conducting the vapors thus produced into a condenser and maintaining a pressure in said system above atmospheric.

8. A method of refining magnesium which comprises vaporizing impure magnesium metal at a temperature below the normal boiling point at atmospheric pressure in the presence of an indifferent gas, conducting the vapors thus produced into a condenser and maintaining a pressure in said system above atmospheric, and circulating said gas cyclically thru the system.

9. A method of refining magnesium which comprises vaporizing impure magnesium metal at a temperature below the normal boiling point at atmospheric pressure and conducting the vapors thus produced into a condenser, the pressure in the condenser being greater than the pressure in the vaporizing step.

10. A method of refining magnesium which comprises vaporizing impure magnesium metal at a temperature below the normal boiling point at atmospheric pressure under the influence of a high vacuum and conducting the vapors thus produced into a condenser, the pressure in the condenser being greater than the pressure in the vaporizing step.

11. A method of refining magnesium which comprises vaporizing impure magnesium metal at a temperature below the normal boiling point at atmospheric pressure under the influence of a high vacuum and conducting the vapors thus produced into a condenser, the pressure in the condenser being greater than the pressure in the vaporizing step and being at or above atmospheric.

12. A method of refining magnesium which comprises vaporizing impure magnesium metal at a temperature below the normal boiling point at atmospheric pressure in the presence of an indifferent gas and conducting the vapors thus produced into a condenser, the pressure in the condenser being greater than the pressure in the vaporizing step.

13. A method of refining magnesium which comprises vaporizing impure magnesium metal at a temperature below the normal boiling point at atmospheric pressure under the influence of a high vacuum and in the presence of an indifferent gas and conducting the vapors thus produced into a condenser, the pressure in the condenser being greater than the pressure in the vaporizing step.

14. A method of refining magnesium which comprises vaporizing impure magnesium metal at a temperature below the normal boiling point at atmospheric pressure in the presence of an indifferent gas, conducting the vapors thus produced into a condenser, the pressure in the condenser being greater than the pressure in the vaporizing step, and circulating said gas cyclically thru the system.

15. A method of refining magnesium which comprises vaporizing impure magnesium metal at a temperature below the normal boiling point at atmospheric pressure under the influence of a high vacuum and in the presence of an indifferent gas, conducting the vapors thus produced into a condenser, the pressure in the condenser being greater than the pressure in the vaporizing step, and circulating said gas cyclically thru the system.

16. A method of refining magnesium which comprises vaporizing impure magnesium metal at a temperature below the normal boiling point at atmospheric pressure, conducting the vapors thus produced into a condenser, the pressure in the condenser being greater than the pressure in the vaporizing step and maintaining the desired pressure in the system.

17. A method of refining magnesium which comprises vaporizing impure magnesium metal at a temperature below the normal boiling point at atmospheric pressure in the presence of an indifferent gas, and conducting the vapors thus produced into a condenser, the pressure in the vaporizing step being greater than the pressure in the condenser.

18. A method of refining magnesium which comprises vaporizing impure magnesium metal at a temperature below the normal boiling point at atmospheric pressure in the presence of an inert or reducing gas and conducting the vapors thus produced into a condenser, the pressure in the vaporizing step being above atmospheric and the pressure in the condenser being approximately atmospheric.

19. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser, and heating the condenser to obtain condensed magnesium in liquid form.

20. A method of refining magnesium which comprises vaporizing impure magnesium metal at a temperature below the normal boiling point at atmospheric pressure under the influence of a high vacuum, conducting the vapors thus produced into a condenser, the pressure in the condenser being greater than the pressure in the vaporizing step, and heating the condenser to obtain condensed magnesium in liquid form.

21. A method of refining magnesium which comprises vaporizing impure magnesium metal at a temperature below the normal boiling point at atmospheric pressure, conducting the vapors thus produced into a condenser, the total pressure therein being materially greater than the partial pressure of the magnesium vapors contained in the gaseous mixture prior to the entrance thereof into said condenser, controlling the pressure in the condenser, and heating the condenser to obtain condensed magnesium in liquid form.

22. A method of refining magnesium which comprises vaporizing impure magnesium metal at a temperature below the normal boiling point at atmospheric pressure under the influence of a high vacuum, conducting the vapors thus produced into a condenser, the pressure in the condenser being greater than the pressure in the vaporizing step, controlling the pressure in the condenser and heating the condenser to obtain condensed magnesium in liquid form.

FRANK R. KEMMER.